United States Patent [19]

Okamoto et al.

[11] 4,287,984

[45] Sep. 8, 1981

[54] BELT WITH PLURAL LAYERS USED IN THE AUTOMATIC DOCUMENT FEEDING APPARATUS

[75] Inventors: Syuzi Okamoto; Naoto Mukai, both of Hachioji, Japan

[73] Assignee: Konishiroku Photo Industry Co., Ltd., Tokyo, Japan

[21] Appl. No.: 115,807

[22] Filed: Jan. 28, 1980

[30] Foreign Application Priority Data

Feb. 13, 1979 [JP] Japan .............................. 54-23418[U]

[51] Int. Cl.[3] ........................ B32B 27/06; B32B 27/32; E65G 15/34

[52] U.S. Cl. .................................... 198/847; 271/275; 428/483; 428/517; 428/909

[58] Field of Search ............... 428/517, 494, 483, 480, 428/516, 519; 271/275; 198/847

[56] References Cited

U.S. PATENT DOCUMENTS

| | | | |
|---|---|---|---|
| 3,024,813 | 3/1962 | Sear et al. | 428/494 |
| 3,444,026 | 5/1969 | Peerman | 428/494 |
| 3,482,676 | 12/1969 | Fackler | 198/847 |
| 3,650,874 | 3/1972 | Job | 428/494 |
| 4,086,388 | 4/1978 | Brown | 428/517 |
| 4,115,614 | 9/1978 | Martin | 428/517 |

FOREIGN PATENT DOCUMENTS

| | | | |
|---|---|---|---|
| 300341 | of 1971 | U.S.S.R. | 428/494 |

*Primary Examiner*—George F. Lesmes
*Assistant Examiner*—E. Rollins Buffalow
*Attorney, Agent, or Firm*—Bierman & Bierman

[57] ABSTRACT

A document feeding belt for the use of an automatic document feeding apparatus in that at least two layers one of which is an internal layer composed of flexible material and the other is an external layer composed of flexible material that is hard to be stained, are used.

4 Claims, 2 Drawing Figures

BELT WITH PLURAL LAYERS USED IN THE AUTOMATIC DOCUMENT FEEDING APPARATUS

BACKGROUND OF THE INVENTION

1. Field of the Invention

This invention relates to the improvement of the document feeding belt for the automatic document feeding apparatus to be attached to the copier such as electrophotographic copying machine.

2. Description of the Prior Art

The automatic document feeding apparatus used in an electrophotographic copying machine (it is referred as copier, sometimes.) is so composed that the automatic document feeding apparatus 1 is positioned onto the surface of the original stand or copy board 3 of the copier 2 as is shown by FIG. 1 (the construction of the copier is not shown, since it is well known in this field.) and the originals (not shown) stacked on the original preparing rest 4 are led toward a feeding belt 7 which is formed with endless and suspended between a driving roller 8 and a driven roller 9 by means of rotation of the feeding roller 5 and a pair of idle rollers 6 which is positioned between the feeding roller 5 and the feeding belt 7. And it is so composed that the feeding belt 7 runs on the surface of the copy board of the copier by means of the driving roller 8 and the driven roller 9 and by means of such running of the belt in a loop, in accordance with the copying operation, and then an original is fed to the predetermined position the copy board 3, at that time the feeding belt 7 is stopped by stopping signal and an stopper (no reference symbol) is out on the copy board so as to engage with a front edge of the original, as is well known. After the completion of the exposure process, the original is delivered to an original receiver 11 through an outlet 10 provided on the top surface of the apparatus by the resumption of the running of the belt.

When the copying operation is carried out by use of such an apparatus, if the size of the original to be copied is smaller than that of the original which has maximum size possible for copy, the image or shadow of the feeding belt 7 positioning outside of the original is also projected onto the surface of photoconductive member (not shown) such as Se, Zno, Cds and so on, simultaneously. Generally, in case of the feeding belt of such kind, plural belts each of which is comparatively narrow in width are juxtaposed with respective spaces. Therefore, from the view point of image quality, it is not desirable that the image of the plural narrow belts is copied in the form that it follows the image of the original. In case of the copier mentioned above, however, if the surface of the narrow belts has white colour and such image of narrow belts is projected onto the surface of the photoconductive member by the white luminessence lamp through a proper optical members (not shown) including an objective lens and a reflecting mirror, no traces thereof will be shown on the member after developing process has been done, because an electric charge on the surface of the photoconductive member where the image of the belts is positioned is totally eliminated. Therefore, in order to prevent the aforesaid drawback, it is satisfactory that all of the narrow belts are made up of the material that is hard to be stained and has high whiteness. However, the restriction that the belt itself must have a high coefficient of friction is essentially imposed, because in case of the automatic document feeding apparatus of such kind, the feeding belt itself is driven by the frictional force of the driving roller 8 and there is a tendency that a possible slip between the driving roller 8 and the belt 7 would directly have an influence on the document feeding performance. In this case, it is convenient if the material of belt that is high both in its whiteness and its coefficient of friction is available, but in case the proper material is not available, the aforesaid problem would be a serious drawback.

This invention has been devised in order to prevent such drawback.

SUMMARY OF THE INVENTION

An object of this invention is to provide a document feeding belt for the use of an automatic document feeding apparatus in that at least two layers or materials one of which is internal layer composed of flexible material having a high coefficient of friction and the other is external layer composed of flexible material that is hard to be stained and has high whiteness, are used.

Followings are the description of this invention based on the examples.

DETAILED DESCRIPTION OF THE PREFERRED INVENTION

Figure 1:
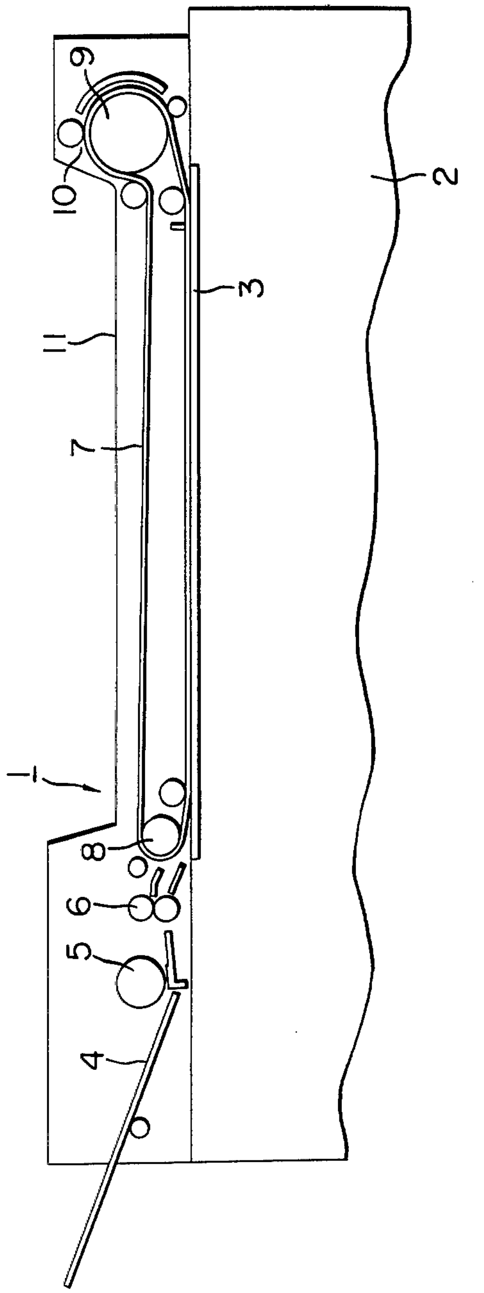
FIG. 1 is a schematic presentation showing one example of the automatic document feeding apparatus that uses the feeding belt relating to this invention.

Regarding to the description of FIG. 1 showing an automatic document feeding apparatus combined with an electrophotographic copying machine is not repeated, though the apparatus also shows an embodiment in which the feeding belt according to this invention is to be utilized.

Figure 2:
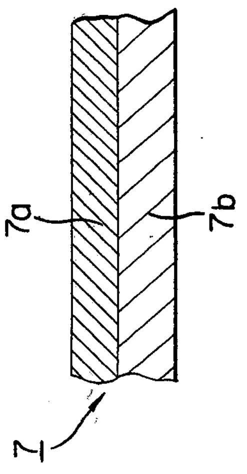
FIG. 2 is a partially enlarged view of the feeding belt.

As is shown in FIG. 2, the feeding belt 7 relating to this invention is of a two-layer composition in which the internal or inner layer **7*a* that contacts the driving roller 8 a pair of pressing rollers (no reference symbol) disposed on the copy board through the lower portion of the belt and the driven roller 9, and the external or outer layer 7*b* that can contact the surface of the copy board 3 are pasted together with proper adhesives. And the inner layer 7*a* is composed of industrial rubber with a good general property such as chloroprene-rubber for example. This rubber is presently represented by Neoprene (name of the product of E. I. du Pont de Nemours & Co. in the United States of America) and Baypréne (name of the product of Bayer AG. in West Germany) and is widely used as an excellent industrial rubber. Meanwhile, the external layer 7*b* is composed of the material that is excellent in color stability and is hard to be stained such as chlorosulphonated polyethylene for example. This material is presently marketed as Hypalon (name of the product of E. I. du Pont de Nemours & Co. in the United States of America) and is used as a tire with white band of an automobile. Moreover, both materials are extremely durable for the use as a feeding belt because they are both good in their adhesive property. Though silicon rubber is thought as material for external layer 7*b***, but it has been proved in our experiments that the silicon rubber is not desirable in view of stain and the cost. As the condition for the external layer, it must be considered that the dust or a foreign matter is attached onto the surface of the layer by influence of a static electricity which is caused or generated between the surface of the copy board and the layer. With respect to the problem of the generation of the static electricity, it can be overcome by conductive treatment of the layer or applying charge preventing agent on the surface of the copy board, for example.

Further, the feeding belt relating to this invention is not necessarily limited to a two-layer composition and can be of a composition of more than three layers depending upon the reasons of the selected materials and adhesives or other reasons. That is to say, the feeding belts may be constructed by three layers, in which polyester layer is positioned between both layers mentioned above, as an intermediate layer.

More, the feeding apparatus which uses the feeding belt according to this invention is detachably mounted onto the copier, and the upper portion of the belt which is positioned far away from the copy board is tightened and the lower portion thereof is loosened in an embodiment. The feeding apparatus may be mounted swingably so that an original to be copied is positioned onto the surface of the copy board by hand, directly.

As stated above, when this invention is used, it is possible to obtain an excellent feeding belt that is suitable for the automatic document feeding apparatus.

What is claimed is:

1. In a document feeding apparatus for use in an electrophotographic copying machine, the improvement comprising a document feeding belt having at least an internal layer and an external layer, said internal layer consisting essentially of chloroprene rubber which is flexible and has a high coefficient of friction, said external layer consisting essentially of chlorosulfonated polyethylene which is flexible, has high whiteness, and is difficult to stain.

2. An apparatus according to claim 1 wherein said belt further comprises an intermediate polyester layer between said internal and said external layers.

3. In a method of feeding documents in an electrophotographic copying machine, the improvement comprising providing a document feeding belt having at least an internal layer and an external layer, said internal layer consisting essentially of chloroprene rubber which is flexible and has a high coefficient of friction, said external layer consisting essentially of chlorosulfonated polyethylene which is flexible, has high whiteness, and is difficult to stain.

4. A method according to claim 3 wherein said belt further comprises an intermediate polyester layer between said internal and said external layers.

* * * * *